United States Patent
Kho et al.

[11] Patent Number: 5,817,281
[45] Date of Patent: Oct. 6, 1998

[54] TEMPERATURE REGULATOR IN AN OZONE GENERATING APPARATUS

[75] Inventors: Kwang-hyun Kho; Kyung-sub Lee, both of Kyonggi-do, Rep. of Korea

[73] Assignee: Samsung Electronics Co., Ltd., Suwon, Rep. of Korea

[21] Appl. No.: 818,553

[22] Filed: Mar. 14, 1997

[30] Foreign Application Priority Data

Oct. 16, 1996 [KR] Rep. of Korea .................. 1996 46283

[51] Int. Cl.[6] ................................... B01J 19/08
[52] U.S. Cl. .................... 422/186.11; 422/186.19
[58] Field of Search ............... 422/186.11, 186.19

[56] References Cited

U.S. PATENT DOCUMENTS

| | | | |
|---|---|---|---|
| 3,836,786 | 9/1974 | Lowther | 250/540 |
| 3,973,133 | 8/1976 | Emigh et al. | 250/532 |
| 4,011,165 | 3/1977 | Filippov et al. | 250/540 |
| 4,101,783 | 7/1978 | Hutter | 250/540 |
| 4,234,800 | 11/1980 | Kenly, V et al. | 250/540 |
| 4,320,301 | 3/1982 | Kogelschatz | 422/186.18 |
| 4,818,498 | 4/1989 | Bachhofer et al. | 422/186.2 |
| 4,988,484 | 1/1991 | Karlson | 422/186.19 |
| 5,089,098 | 2/1992 | Tacchi | 204/176 |
| 5,147,614 | 9/1992 | Conrad | 422/186.18 |
| 5,198,717 | 3/1993 | Kogelschatz et al. | 313/17 |
| 5,235,251 | 8/1993 | Schlie | 315/112 |

OTHER PUBLICATIONS

Instruction Manual for High Concentration Ozone Generator (Sumitomo Precision Products Co., Ltd.) Rev. 13, Dec. 21, 1992.

*Primary Examiner*—Daniel J. Jenkins
*Attorney, Agent, or Firm*—Jones & Volentine, L.L.P.

[57] ABSTRACT

Disclosed is an ozone generator used for an $O_3$-TEOS process wherein a temperature regulator includes a sensor for measuring a temperature of an insulating oil and a controller for controlling an operation of a cooling system in response to a signal from the sensor. The cooling system maintains the insulating oil at a constant temperature for cooling discharge cells to prevent damage to the discharge cells when generating ozone.

6 Claims, 2 Drawing Sheets

TEMPERATURE REGULATOR IN AN OZONE GENERATING APPARATUS

BACKGROUND OF THE INVENTION

1. Field of the Invention

The present invention relates generally to an apparatus for generating ozone ($O_3$) used for an $O_3$-TEOS (ozone-tetraethylorthosilane) process, and more particularly, to a temperature regulator in a control circuit for an $O_3$ generator which maintains the insulating oil for cooling the discharge cells at a constant temperature to prevent the discharge cells from overheating and being damaged.

2. Description of the Related Art

In a semiconductor manufacturing process, insulating films are usually deposited on the top of a semiconductor in order to protect its surface, or to serve as masks through which selective diffusions and implants can be made. The insulating films also serve as the base for electrical connections between semiconductor devices in a microcircuit. Often they provide the role of an interlayer dielectric between two layers or levels of metalization.

In all these above-described situations, it is highly desirable that the insulating films be free from pinholes and cracks, both when grown, and also if subjected to heat treatments during subsequent manufacturing processes. Thus their built-in stress, as well as the stress during thermal cycling, must be sufficiently low to maintain their integrity. These requirements become increasingly important in very large scale integration (VLSI) technology, especially as wafer sizes increase and the devices become more densely packed or integrated.

Films that are useful in semiconductor applications must be capable of preventing the transport of dopant species through them, in addition to maintaining their integrity at diffusion temperatures. Furthermore, they must be capable of being etched into fine line patterns by photolithographic techniques. Often these films are left in place after having performed the masking function. The films, therefore, should be either highly insulating if used as cover layers, or highly conducting if used in the subsequent metalization scheme.

Some deposited films can be used for the protection of microcircuits during manufacture, and also for improving their reliability in use. In addition, they can be used to block the movement of light alkali ions such as sodium, or else getter them so as to render them immobile. These types of films are usually placed over the metalization layers to prevent damage during handling.

On the other hand, silica films can be grown by the pyrolytic oxidation of a variety of alkoxysilanes, in the 700°–800° C. temperature range. The most widely used compound is tetraethylorthosilane (TEOS) which is a liquid at room temperature (boiling point=167° C.), and must be transported to the reaction chamber by means of a bubbler arrangement. The oxidation reaction is commonly carried out in a cold wall chemical vapor deposition (CVD) system at 800° C., and proceeds as follows:

$$Si(C_2H_5O)_4 + 12O_2 \rightarrow SiO_2 + 8CO_2 + 10H_2O \quad \text{(Eq. 1)}$$

As seen from this reaction, a large amount of water is produced as a by-product for each molecule of $SiO_2$ that is generated. Consequently, the silica films are of relatively poor quality because of the water incorporation. In addition, secondary reaction products such as silicon dioxide, carbon, and organic radicals are also present in these films.

The growth of silica films from TEOS has largely been superseded by deposition involving the oxidation of silane. The silane reaction, when carried out at 600°–1000° C., also results in the formation of water as a by-product. However, hydrogen formation is favored at lower temperature (300°–500° C.) where the reaction proceeds as follows:

$$SiH_4 + O_2 \rightarrow SiO_2 + 2H_2O \quad \text{(Eq. 2)}$$

resulting in high-quality silica films. Typically, this reaction is carried out at atmospheric pressure in a cold wall CVD system of the resistance heated type, because of the low temperature involved. The resulting film has a built-in tensile stress of about $3 \times 10^9$ dyn/cm² for a 450° C. growth temperature.

Pure silane is a highly pyrophoric gas which burns on exposure to air. Consequently silane is commonly supplied in a low dilution (typically 5–10% by volume) in argon or nitrogen. Silane is safer to handle in this form and is stable in these dilutions. The growth of silica films from silane proceeds by the strong adsorption of $O_2$ on the silicon surface, and its subsequent reaction with silane to form silicon dioxide. This can lead to a retardation in the growth rate when $O_2$ is present in high concentrations. Typically, the $O_2$: $SiH_4$ mole ratio must not exceed 8–10 to avoid this retardation effect.

The growth rate of films by the silane process is quite high, typically 500–1000 Å/min. Consequently, these films can be used in many applications where rapid, low-temperature growth is essential. These include the following:

1. Thick field oxides for metal oxide semiconductors (MOS) microcircuits as well as for high-voltage devices. These are usually deposited over a base layer of thermally grown oxide to avoid a high trap density at the silicon surface.
2. Films where the previously grown layer has been removed, for example, deep diffusions of the type used for buried layers and isolation walls.
3. Insulating layers over a metalization layer, to form a base for the next layer of metal.
4. Cover layers to protect the microcircuit from physical abuse during mounting and packaging.
5. Diffusion masks for gallium arsenide. The native oxide rapidly deteriorates at high temperatures (>700° C.) and cannot be used in this application.
6. Cap layers for regions of gallium arsenide which must not be exposed during processing, for example, the back side of a slice.

Low pressure CVD systems of the hot wall type are also used, and result in better film uniformity from slice, as well as having an increased throughput. In addition, film quality is generally superior to that obtained in an atmospheric pressure system, with a reduced pinhole density. However, the growth rate is significantly slower (100–150 Å/min), so that the technique is suited for the growth of relatively thin oxides.

Silicon dioxide can also be grown at low pressure (≈0.1–0.5 torr) in a plasma-enhanced system. Here the basic reactions that can be used involve $SiH_4$–$O_2$, $SiH_4$ $CO_2$, and $SiH_4$–$N_2O$ mixtures. The $SiH_4$–$N_2O$ system can be operated at low temperatures (250° C.) with growth rates that are comparable to those obtained with the $SiH_4$–$O_2$ system at atmospheric pressure (≈3%).

Plasma-enhanced CVD techniques result in a built-in compressive stress in the deposited silica films. This greatly reduces the tendency of cracking during subsequent thermal cycling. As a result, films grown by this method can be much thicker than those grown at atmospheric pressure. Finally, films grown by this technique are almost completely free of pinholes, so that they are suited for cap layers in VLSI applications.

Notwithstanding their high quality, deposited oxide films have a much higher contamination level (and an associated trap density) than thermally grown oxide films. Thus they are not suitable for use as gate oxides in MOS microcircuits. Usually they are grown over an initial thin (100–200 Å) native oxide to avoid direct contact with the silicon surface. This is especially true when coverage is required over lightly doped silicon, or over regions where a junction is expected at the Si-SiO$_2$ interface.

However, the SiO$_2$ layer formed using O$_2$ and TEOS to function as an interlayer dielectric has somewhat poor step coverage. Thus a recently proposed technique is to use O$_3$ instead of O$_2$, of which reaction proceeds as follows:

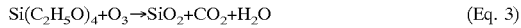

$$Si(C_2H_5O)_4 + O_3 \rightarrow SiO_2 + CO_2 + H_2O \qquad \text{(Eq. 3)}$$

In the plasma CVD system using this method, the O$_3$ generator is necessarily required. A cooling system is also required for maintaining the O$_3$ generator at a constant temperature, especially by diminishing an undesirably increased temperature while the O$_3$ is created.

FIG. 1 is a schematic diagram of a conventional O$_3$ generator and FIG. 2 is a block diagram of a control circuit of the compressor employing a temperature regulator of FIG. 1.

As shown in FIG. 1, the typical O$_3$ generator is comprised of an ozonizer 10 for generating O$_3$ of high concentration, an insulating oil circulation system 20 for circulating the insulating oil 21 which functions as a chilled oil to maintain the ozonizer 10 at a constant temperature, and a cooling system 30 for cooling the insulating oil 21.

The ozonizer 10 includes six discharge cells 11 and three power units 15 for supplying power to electrodes 13, each electrode 13 being arranged between two adjacent discharge cells 11. The discharge cells 11 are connected by an external tube (not shown), through which external air including O$_2$ follows in the order of arrangement of the discharge cell 11. In order to cool the discharge cells 11, the insulating oil 21 passes through the external tube provided in the electrodes 13.

The insulating oil circulation system 20 includes an oil circulating pump 25 for circulating the insulating oil 21 in or through the electrodes 13 to cool the discharge cells 11, a temperature regulator 27 for measuring the temperature of the insulating oil 21 and for controlling the operation of the cooling system 30 based on the measured temperature, and an oil flow switch 29 which is turned on to drive a warning device (not shown) when the insulating oil 21 does not flow.

The general construction of the cooling system 30 includes a compressor 31, condenser 33, dryer 35, capillary tube 37 and vaporizer 39. The vaporizer 39 is immersed in the insulating oil 21 of the storage tank 23.

There is further provided a switch 32 (see FIG. 2), which is a type of temperature indication controller, for supplying or interrupting three-phase power to the compressor 31. The temperature regulator 27, which is an electrically connected bimetal type, is designed to turn the switch 32 on or off. The oil flow switch 29 is designed to operate the warning device (not shown) by sensing when the insulating oil 21 does not flow.

This conventional O$_3$ generator is operated as follows. When O$_2$ is supplied to the lowermost discharge cell 11 among the 6 discharge cells 11 in the O$_3$ generator 10, it flows toward the uppermost discharge cell 11 through the external tube (not shown). At this time, the high-level A.C. 200V power from the three power units 15 is supplied to the corresponding electrodes 13. As a result, the discharge cells 11 discharge and O$_2$ is completely converted into O$_3$ as it passes these discharge cells 11. The O$_3$ passing by the uppermost discharge cell 11 is next supplied to the plasma CVD apparatus (not shown) for creating the oxide film functioning as an interlayer dielectric, for example.

However, when the high level A.C. power (1000W) is supplied to the electrodes 13, the discharge cells 11 discharge and generate undesirably high heat. To cool such discharge cells 11, the insulating oil 21 is continuously circulated by the insulating oil circulating pump 25 to pass through the electrodes 13. However, the insulating oil 21 is gradually heated as it repeatedly passes the electrodes 13. Consequently, sufficient cooling of the discharge cells 11 becomes impossible and it is also reduces the ability of the discharge cells 11 to generate O$_3$ of high concentration. In addition, the insulation characteristics of the insulating oil 21 are reduced and the electrodes 13 may short, whereby the discharge cells 11 burn.

To prevent these phenomena, the insulating oil 21 must maintain a constant temperature of about 15° C. at any given time, so it is necessary to cool the heated insulating oil 21 using the cooling system 30.

More specifically, if the temperature of the insulating oil 21 increases to a predetermined value, the bimetal type temperature regulator 27 turns on the switch of compressor 31 by contacting the contact points a, b as shown in FIG. 2.

The compressor 31 then starts operating, whereby the cooling agent is compressed, radiated and cooled while successively passing the compressor 31, condenser 33, dryer 35 and capillary tube 37. Then, when the cooling agent passes through the vaporizer 39, the temperature of the insulating oil 21 is reduced by the cooling agent.

Such successive steps are performed repeatedly until the temperature of the insulating oil 21 reaches 15° C. When the temperature is at 15° C., the temperature regulator 27 turns off the switch 32 of the compressor 31 by separating from the contact points a, b. The operation of compressor 31 and the cooling of the insulating oil 21 are stopped, so that the temperature can be maintained at 15° C. at all times.

In theory, if the temperature regulator 27 controls the operation of the switch based on the temperature of the insulating oil 21 as mentioned above, the temperature of the insulating oil is uniformly maintained at the most suitable degree for the O$_3$ formation, whereby the discharge cells 11 continuously generate O$_3$ of high concentration.

However, it is very hard to expect accurate operation of the temperature regulator 27 because it is a bimetal type. This makes it impossible to maintain the insulating oil at 15° C. which is the most suitable temperature for the O$_3$ formation.

Moreover, the incorrect operation of the temperature regulator 27 may frequently occur, causing the switch 32 of the compressor 31 to maintain an "on" state even when the compressor 31 should be stopped. In such a situation, frost may form around the compressor 31 and the temperature of the insulating oil 21 will become too low. Consequently, the temperature of the discharge cells 11 will also be lowered undesirably. In addition, frost may form around the discharge cells 11, creating a short-circuit of the electrodes 13 and burning the discharge cells 11.

The expensive discharge cells 11 are thus damaged and the operation of the O$_3$ generator must be stopped to exchange the damaged discharge cells with new ones. Accordingly, an increase in manufacturing costs and a decrease in yield results.

SUMMARY OF THE INVENTION

In view of the above, it is an object of the present invention to provide an $O_3$ generator capable of maintaining the insulating oil at a desired temperature to prevent the discharge cells from being damaged.

To achieve these and other objects, the present invention provides an $O_3$ generator comprising a temperature regulator that measures the temperature of the insulating oil and controls a switch of a compressor based on the measured temperature to maintain the insulating oil at a constant temperature for cooling discharge cells. Further, according to this invention, when the temperature of the insulating oil is below a designated lower value, or above a designated upper value, a warning device is operated by the controller to prevent damage of the discharge cells by allowing a rapid response the warning sign.

DETAILED DESCRIPTION OF THE PREFERRED EMBODIMENTS

Figure 3:
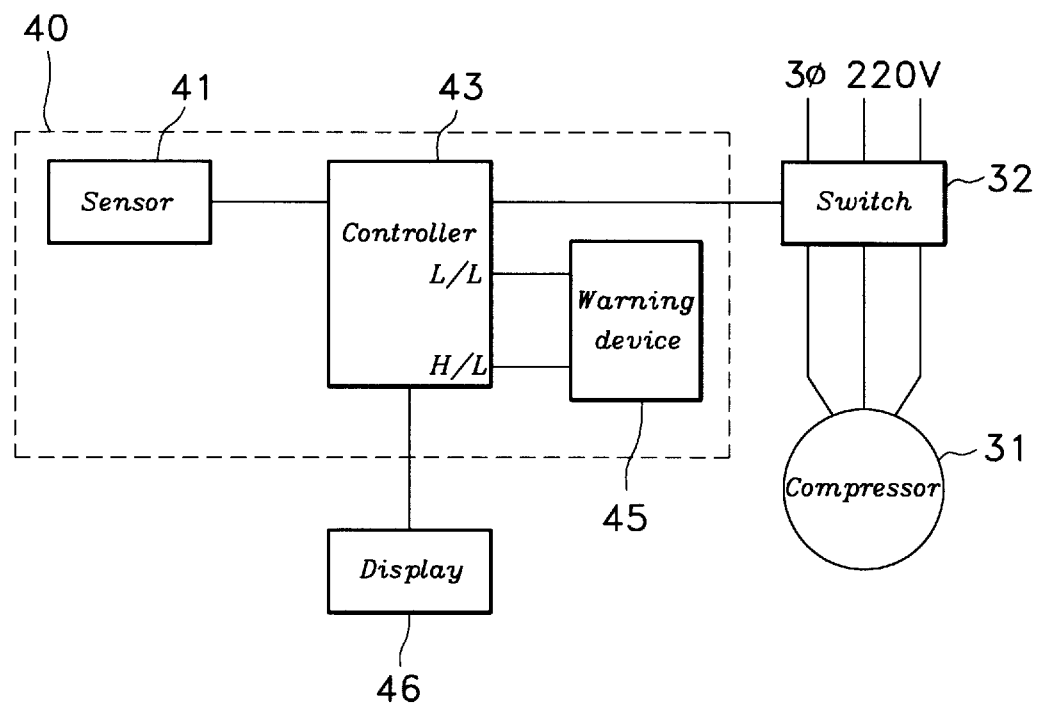
FIG. 3 is a block diagram of a control circuit of the compressor employing a temperature regulator according to the present invention.

In the following description, like reference numerals designate like or corresponding elements of the conventional art. Referring to FIG. 3, there is illustrated a block diagram of a control circuit of a compressor 31 employing a temperature regulator 40 according to the present invention.

As shown in FIG. 3, the temperature regulator 40 is comprised of a sensor 41, a controller 43 for controlling a switch 32 of a compressor 31 based upon the temperature measured by the sensor 41, and a warning device 45 for outputting a warning signal in response to the signal from the controller 43.

Figure 1:
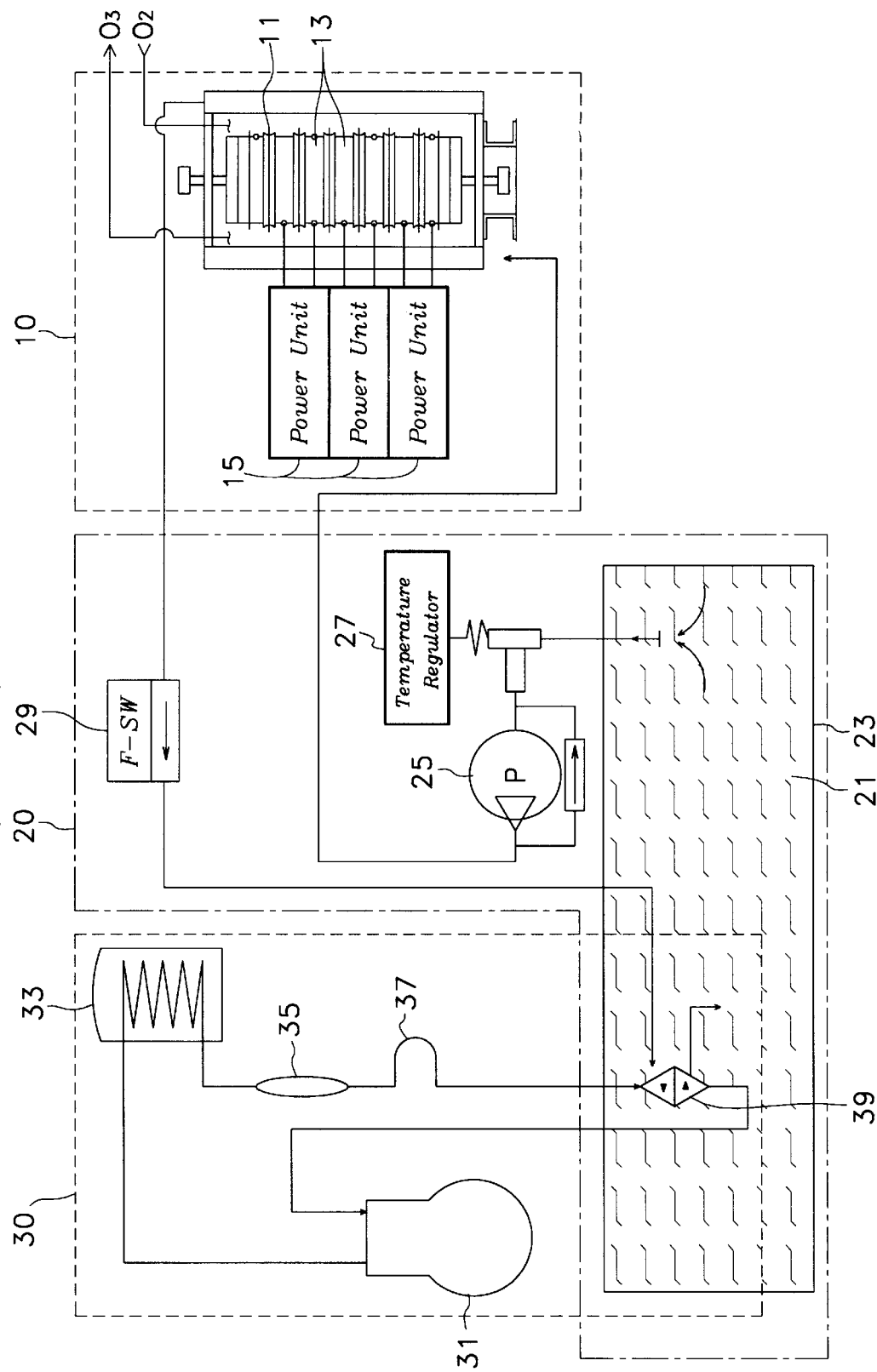
FIG. 1 is a schematic diagram of conventional $O_3$ generator.
Figure 2:
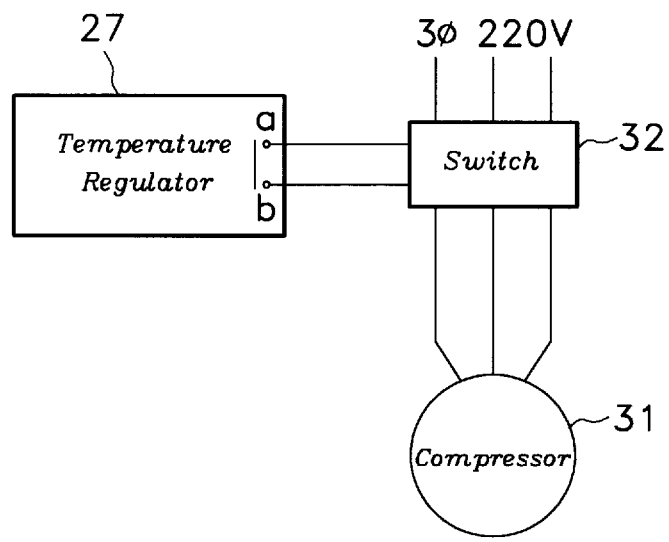
FIG. 2 is a block diagram of a control circuit of the compressor employing a temperature regulator of FIG. 1.

The operation of the temperature regulator 40 is described below with reference to FIGS. 1 and 3. When $O_2$ is supplied to the lowermost discharge cell 11 in the ozonier 10 in the same manner as the conventional art, it flows toward the uppermost discharge cell 11 through an external tube (not shown). At this time, the high-level A.C. power from three power units 15 is supplied to the corresponding electrodes 13. As a result, the discharge cells 11 discharge and $O_2$ is completely converted into $O_3$ while passing these discharge cells 11. The $O_3$ passing by the uppermost discharge cell 11 may then be supplied to a plasma CVD apparatus (not shown) for creating the oxide film functioning as an interlayer dielectric, for example.

As described previously, when the high-level voltage power above 1,000W is supplied to the electrodes 13, the discharge cell 11 discharges and generates undesirably high heat. To cool such discharge cells, the insulating oil 21 in the storage tank 23 is continuously circulated by the insulating oil circulating pump 25, thereby repeatedly passing by the electrodes 13. However, the insulating oil 21 is gradually heated as it repeatedly passes the electrodes 13. Consequently, sufficient cooling of the discharge cells 11 becomes impossible and it is also reduces the ability for the discharge cells 11 to generate $O_3$ of high concentration. In addition, the insulation characteristics of the insulating oil 21 are reduced and the electrodes 13 may short, whereby the discharge cells 11 burn.

To prevent these phenomena, the insulating oil 21 must maintain a constant temperature of about 15° C. at any given time, so it is necessary to cool the heated insulating oil 21 using the cooling system 30.

More specifically, if the temperature of the insulating oil 21 increases to a predetermined value, the sensor 41 of the temperature regulator 40 senses the precise temperature and outputs the corresponding signal to the controller 43, for example, a temperature indication controller (TIC). The controller 43 outputs the signal to the switch 32 for operating the compressor 31, whereby the compressor 31 is turned on.

Successively, a three-phase driving power of 220V is supplied to the compressor 31 through the switch 32. The compressor 31 starts operating and the insulating oil 21 is gradually cooled.

In this manner, when the insulating oil 21 is at 15° C., which is the most advantageous temperature for generating $O_3$, the sensor 41 senses that precise temperature and outputs the corresponding signal to the controller 43. The controller 43 then outputs a signal to the switch 32 to stop the compressor 31, whereby the compressor 31 is turned off.

Consequently, the supply of the driving power to the compressor 31 is interrupted and the operation of the compressor 31 ceases at the same time. In this compressor "off" state, the insulation oil 21 is not cooled any more, and it maintains the proper temperature for a period of time thereafter.

The temperature of the insulating oil 21 is thus controlled by turning the compressor 31 on and off so that the discharge cells 11 can continuously generate $O_3$ of high concentration.

However, it is possible that due to some abnormal occurrence, the insulating oil temperature may be below the lower temperature limit, but the compressor 31 is still operating, or the temperature may be above the upper temperature limit, but the compressor 31 is still stopped. In these cases, on sensing these abnormalities, the sensor 41 outputs the corresponding signals to the controller 43 and the controller 43 activates the warning device 45 in order that the worker or supervisor can take immediate steps to rectify the situation. The warning device 45 can use either a visible light or an audible alarm, or both at the same time.

In addition, the controller 43 is designed to display the temperature of the insulating oil 21 on the display 46 in order that the worker can quickly and visually ascertain the temperature of the insulating oil at any time and can take immediate steps against the abnormal situations.

As a result, it is possible to prevent frost from forming around the discharge cells 11 since the insulation oil 21 is accurately maintained at a constant temperature. In addition, a short-circuit between the electrodes 13 due to the frost can be prevented and the probability of burning the electrodes is also diminished.

As described above, the $O_3$ generator of the present invention accurately controls the operation of the compressor, enabling the insulating oil to be maintained at the most advantageous temperature for forming $O_3$. As a result, continuous $O_3$ production is available and the quality of the interlayer dielectric for the multi-metalization process is enhanced.

Further, there is no damage to the discharge cells due to the frost and the operation rate of the $O_3$ generator and the CVD apparatus are improved, enhancing the yield.

While this invention has been described in connection with what is presently considered to be the most practical and preferred embodiments, it is to be understood that the invention is not limited to the disclosed embodiment, but, on the contrary, it is intended to cover various modifications and equivalent arrangements included within the spirit and scope of the appended claims.

What is claimed is:

1. An apparatus for generating ozone ($O_3$) comprising:

an ozonizer for creating ozone;

an insulating oil circulation system including an oil circulating pump for circulating insulating oil to cool the ozonizer;

a cooling system for cooling the insulating oil;

a temperature regulator for measuring a temperature of the insulating oil and for controlling an operation of the cooling system, said temperature regulator having a sensor for measuring the temperature of the insulating oil and a controller for controlling the operation of the cooling system in response to a signal from the sensor.

2. An apparatus as in claim 1, wherein the controller comprises a temperature-indicating controller.

3. An apparatus as in claim 1, further comprising a warning device for outputting a warning signal, said warning device being controlled by the controller.

4. An apparatus as in claim 3, wherein the warning device is operated when the measured temperature increases to a predesignated upper limit.

5. An apparatus as in claim 3, wherein the warning device is operated when the measured temperature decreases to a predesignated lower limit.

6. An apparatus as in claim 3, wherein the warning device is operated when measured temperature reaches one of a predesignated upper limit and a predesignated lower limit.

* * * * *